US008712993B1

(12) United States Patent
Ordonez

(10) Patent No.: US 8,712,993 B1
(45) Date of Patent: Apr. 29, 2014

(54) HORIZONTAL AGGREGATIONS IN A RELATIONAL DATABASE MANAGEMENT SYSTEM

(75) Inventor: Carlos Ordonez, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 2473 days.

(21) Appl. No.: 10/864,154

(22) Filed: Jun. 9, 2004

(51) Int. Cl.
G06F 17/30 (2006.01)

(52) U.S. Cl.
USPC .......................................... 707/713; 707/718

(58) Field of Classification Search
USPC ............ 707/103, 713, 718; 395/600; 364/283
See application file for complete search history.

(56) References Cited

U.S. PATENT DOCUMENTS

| 5,412,804 | A | * | 5/1995 | Krishna | 707/2 |
|---|---|---|---|---|---|
| 6,775,682 | B1 | * | 8/2004 | Ballamkonda et al. | 707/102 |
| 6,842,753 | B2 | * | 1/2005 | Chaudhuri et al. | 707/10 |
| 6,947,929 | B2 | * | 9/2005 | Bruce et al. | 707/5 |
| 2002/0124001 | A1 | * | 9/2002 | Chaudhuri et al. | 707/100 |
| 2004/0064449 | A1 | * | 4/2004 | Ripley et al. | 707/5 |
| 2005/0096943 | A1 | * | 5/2005 | Siegalovsky et al. | 705/2 |

OTHER PUBLICATIONS

Oracle SQL Second Edition. The Prentice Hall Professional Technical Reference 2003 pp. 444-445.*
Virginia Anderson "The complete Reference Access 2000" Osborne/McGraw-Hill Copyright 1999.*
Alice Rischert, Oracle SQL Second Edition Interactive Workbook, Nov. 2002 (2003 Pearson Education Inc.).*
E. Baralis et al., "Materialized View Selection in a Multidimensional Database," Proceedings of the $23^{rd}$ VLDB Conference, Athens, Greece, pp. 1-10 (1997).
J.A. Blakeley et al., "Efficiently Updating Materialized Views," ACM SIGMOD Conference, pp. 1-11 (1986).
U. Fayyad et al., "The KDD Process for Extracting Useful Knowledge from Volumes of Data," Communications of the ACM, vol. 39, No. 11, pp. 27-34 (Nov. 1996).
L. Fu et al., "CUBIST: A New Approach to Speeding Up OLAP Queries in Data Cubes," University of Florida, Gainesville, FL, Technical Report TR01-007, pp. 1-19 (May 2001).
G. Graefe et al., "on the Efficient Gathering of Sufficient Statistics for Classification from Large SQL Databases," Proceedings of the $4^{th}$ International Conference on Knowledge Discovery & Data Mining (KDD98), pp. 204-208 (1998).
J. Gray et al., "Data Cube: A Relational Aggregation Operator Generalizing Group-By, Cross-Tab, and Sub-Totals," Proceedings for the $12^{th}$ International Conference on Data Engineering, pp. 152-159 (1996).
H. Gupta et al., "Index Selection for OLAP," ICDE Conference 1997, pp. 1-12 (1997).
J. Han et al., "Efficient Computation of Iceberg Cubes with Complex Measures," ACM SIGMOD Conference 2001, pp. 1-12 (2001).
V. Harinarayan et al., "Implementing Data Cubes Efficiently," ACM SIGMOD Conference 1996, pp. 1-25 (1996).

(Continued)

Primary Examiner — Apu Mofiz
Assistant Examiner — Fariborz Khoshnoodi
(74) Attorney, Agent, or Firm — Trop, Pruner & Hu P.C.

(57) ABSTRACT

A database system is able to receive a query containing a horizontal aggregate function. In response to the query containing the horizontal aggregate function, aggregate values are produced in a horizontal format. In general, the query can contain both horizontal (new) aggregate functions and vertical (standard) aggregate functions.

14 Claims, 2 Drawing Sheets

(56) References Cited

OTHER PUBLICATIONS

C. Ordonez et al., "SQLEM: Fast Clustering in SQL Using the EM Algorithm," ACM SIGMOD Conference 2000, pp. 559-570 (2000).

D. Theodoratos et al., "Data Warehouse Configuration," Proceedings of the 23$^{rd}$ VLDB Conference, Athens, Greece, pp. 1-10 (1997).

Y. Zhuge et al., "View Maintenance in a Warehousing Environment," ACM SIGMOD Conference 1995, pp. 1-12 (1995).

* cited by examiner

HORIZONTAL AGGREGATIONS IN A RELATIONAL DATABASE MANAGEMENT SYSTEM

BACKGROUND

A database is a collection of logically related data arranged in a predetermined format, such as in tables that contain rows (tuples) and columns (attributes). To access the content of a table in the database, queries according to a standard database query language (e.g., Structured Query Language or SQL) are submitted to the database system. A query can be issued to insert new entries into a table of a database (such as to insert a row into the table, modify the content of the table, or to delete entries from the table).

As the technology of storage devices and database software have improved, the capacity of database systems have also increased dramatically. An application of database systems is data warehousing, where data from various sources are collected and stored in the data warehouse. The amount of data that can be stored in the data warehouse can be immense. To process information within such data warehouses, on-line analytical processing (OLAP) is typically performed. Usually, on-line analytical processing involves the calculation of aggregates on large data sets. Examples of aggregates include the calculation of a sum of values of a given attribute, the calculation of an average, the calculation of a minimum, the calculation of a maximum, the counting of a number of rows, and so forth. Aggregates are also used for data mining applications. Data mining involves building statistical models or finding patterns in large data sets.

Aggregates are typically calculated in conjunction with group-by operations. A group-by operation is specified by an SQL SELECT statement that includes a GROUP BY clause. The GROUP BY clause specifies a grouping function that groups output results according to one or more grouping attributes (columns). The output of the group-by operation is a set of groups of rows, where each group contains an aggregate of multiple rows (on a given attribute) that share a common value of the grouping attribute(s).

In a database system containing very large relational tables, the result of a group-by operation can produce a large number of rows. Typically, it is difficult to understand a result set (of a group-by operation) that contains a large number of rows. As a result, outputs produced by conventional database systems for group-by operations may not be very useful for OLAP, data mining, or other statistical or analytical algorithms. Generally, software for performing OLAP, data mining, or other statistical or analytical algorithms are unable to efficiently analyze detailed outputs of aggregate operations. Conventionally, users have to spend great time and effort to summarize detailed aggregation outputs for use by such software.

SUMMARY

In general, a mechanism is provided to produce outputs of grouping and aggregate operations in a horizontal format to enhance the ability to more readily understand the outputs of the grouping and aggregate operations and to enable efficient analysis of the outputs in horizontal format by OLAP, data mining, and other statistical or analytical algorithms. Each row of the output in horizontal format has plural aggregate values.

Other or alternative features will become apparent from the following description, from the drawings, or from the claims.

DETAILED DESCRIPTION

Figure 1:
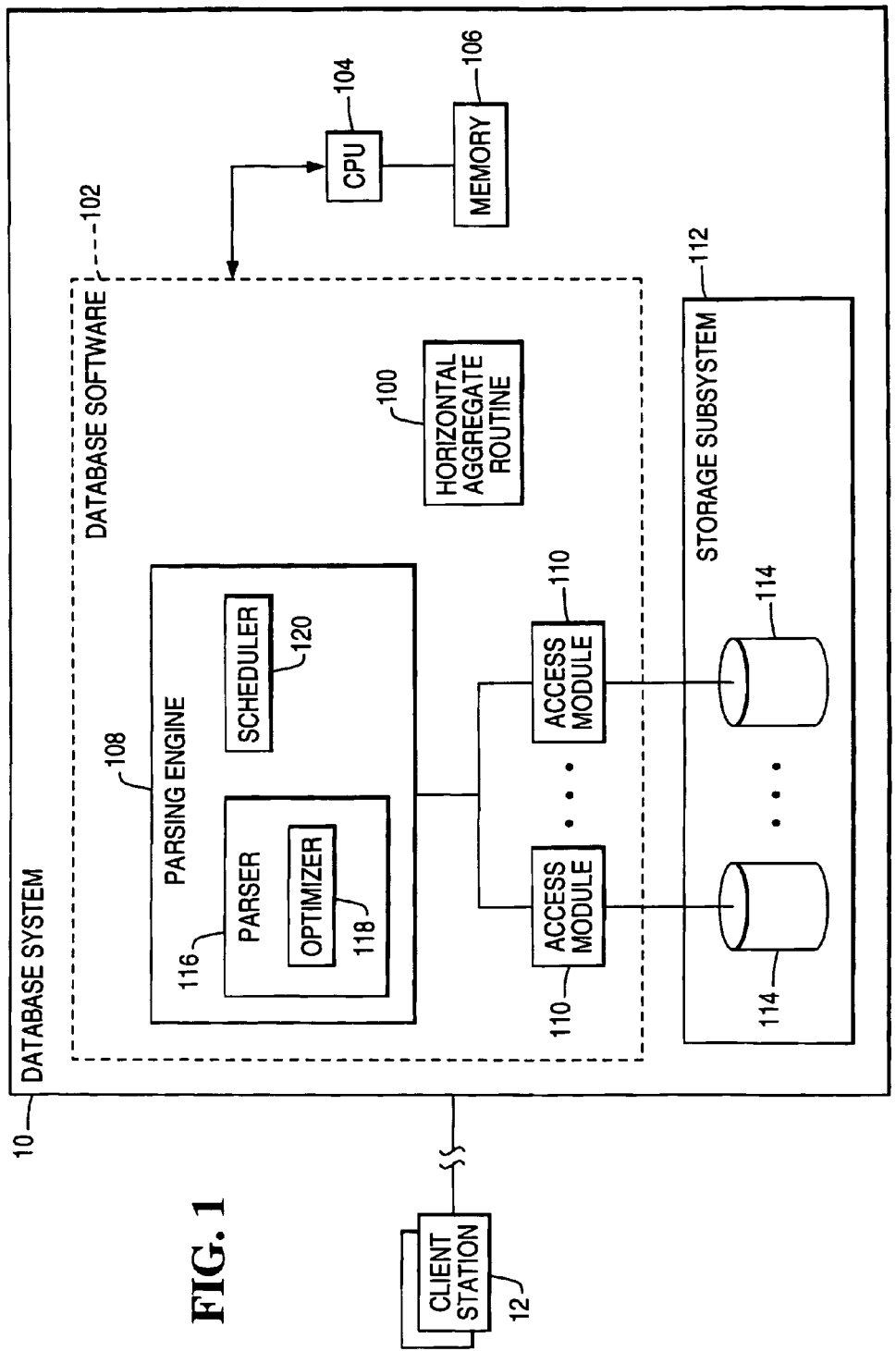
FIG. 1 is a block diagram of an example arrangement that includes a database system coupled to one or more client stations.

In the following description, numerous details are set forth to provide an understanding of the present invention. However, it will be understood by those skilled in the art that the present invention may be practiced without these details and that numerous variations or modifications from the described embodiments are possible.

In accordance with some embodiments of the invention, a mechanism is provided in a database system for performing horizontal aggregations. A "horizontal aggregation" is an aggregation that produces multiple aggregates in at least one row of the output result. Conventionally, when aggregation is performed in conjunction with a grouping operation, each aggregate value is provided in a separate output row, where the aggregate value represents an aggregation (e.g., sum, average, count, maximum, minimum, etc.) of values of a given attribute in rows that belong to a group. In a database system having a large data set, the number of rows produced by a grouping operation can be quite large, particularly if the grouping is based on multiple attributes. The large number of output rows is often unwieldy and difficult to understand.

However, in accordance with some embodiments of the invention, rather than limit the output of grouping and aggregate operations to a vertical format (with one aggregate per row), horizontal aggregation enables aggregates to be arranged either horizontally or as a two-dimensional matrix. The horizontal or two-dimensional matrix format (both hereinafter referred to as a "horizontal format") enables the outputs of grouping and aggregate operations to be more useful for analytical purposes, such as for on-line analytical processing (OLAP), data mining, or other applications. As used here, a conventional aggregation is referred to as "vertical aggregation," which is contrasted with the horizontal aggregation according to some embodiments that enables the output of multiple aggregate values in each output row.

Examples of horizontal aggregation is described below in reference to a SALES table that contains various attributes regarding sales of a company: ItemID (the identifier of an item sold), StoreID (the identifier of a store), DayOfWeek (the day of the week a sales occurred), MonthNo (the month a sales occurred in), State (the state a store is located in), City (the city a store is located in), SalesAmt (the dollar amount of a sale), and ItemQty (the quantity of an item sold).

In the SALES table, there are several dimensions represented by ItemId, DayOfWeek, MonthNo, State and City, that can be used to group rows, and two measures represented by ItemQty and SalesAmt, to pass as arguments to aggregate functions. Example queries that can be submitted against the SALES table include a query specifying computation of the total sales for each day of the week for each store:

SELECT StoreId, DayOfWeek, SUM(SalesAmt)
FROM SALES GROUP BY StoreID, DayOfWeek;

If there are a 100 stores and 7 days in a week, then a conventional (vertical) group-by operation will produce 700 output rows, with each row containing an aggregate value SUM(SalesAmt), which represents the sum of dollar sales occurring in a given store on a given day. Normally, it is more difficult to understand an output result with a larger number of rows. A more easily understandable output result would be an output result having 100 rows (for the 100 stores), with each row containing seven aggregate values, one for each day of the week. Such an output result is an example of a horizontal aggregation in which the group-by output result is organized as a matrix, as shown below (only a portion of the output results are shown).

TABLE 1

SalesAmt

| StoreID | Mon | Tue | Wed | Thu | Fri | Sat | Sun | Total Sales |
|---------|-----|-----|-----|-----|------|------|------|-------------|
| 2       | 100 | 300 | 200 | 400 | 400  | 500  | 700  | 2600        |
| 4       | 0   | 250 | 500 | 500 | 1000 | 1000 | 1000 | 4250        |
| 7       | 200 | 50  | 150 | 300 | 300  | 400  | 400  | 1800        |

Another query that can be submitted against the SALES table is "show me the number of items sold in each department for each store":

SELECT StoreId, Department, SUM(ItemQty)
FROM SALES GROUP BY StoreID, Department;

If there are 100 stores and 20 departments, then the output result of the grouping and aggregation operation will include 2,000 output rows. A more understandable output format (produced by horizontal aggregation) would be a matrix having 100 rows (for the 100 stores), with each row having 20 aggregate values (for the 20 departments). This output format is an example of a horizontal format.

The framework for horizontal aggregation is similar to the framework for vertical aggregation. Assume AGG( ) represents any standard SQL vertical aggregation (e.g. SUM( ) COUNT( ) MIN( ); MAX( ) AVG( ). To perform horizontal aggregation, the following aggregate function is provided: HAGG(A BY $D_{j+1}, \ldots, D_k$), where A is an attribute (or attributes) on which aggregation is to be performed. The remaining arguments $D_{j+1}, \ldots, D_k$ represent the list of grouping columns to compute individual aggregations. Note that one or plural grouping columns D can be specified. The result rows are determined by the columns $D_1, \ldots, D_j$ in the GROUP BY clause if present. A query that specifies a horizontal aggregate generally has the following form:

SELECT $D_1, \ldots, D_j$, HAGG(A BY $D_{j+1}, \ldots, D_k$)
FROM F
GROUP BY $D_1, \ldots, D_j$;

This HAGG( ) function returns a set of numbers (representing multiple aggregate values) for each group. Note that more than one HAGG( ) function can be specified in a query. There are four basic elements for performing horizontal aggregation:

(1) grouping columns or attributes $D_1, \ldots, D_j$ specified in the GROUP BY clause;
(2) sub-grouping columns or attributes $D_{j+1}, \ldots, D_k$ specified in the argument list of the HAGG( ) function;
(3) the HAGG( ) function itself, which can be any existing aggregate function such as SUM, AVG, MIN, MAX, COUNT, and so forth;
(4) the aggregated column or attribute A.

Note that the horizontal aggregate functions HAGG( ) are compatible with vertical aggregate functions. In other words, a query can specify both horizontal and vertical aggregate functions. The horizontal aggregate functions are generally as convenient to use as vertical aggregate functions. Note that the horizontal aggregate function is basically a vertical aggregate function plus the sub-grouping clause (the BY clause in the HAGG( ) function).

All the individual aggregations for each group will appear on the same row in a horizontal form. The HAGG( ) function allows the computation of aggregates based on any subset of columns not used in the GROUP BY clause—in other words, the grouping columns $D_{j+1}, \ldots, D_k$ in the HAGG( ) argument list are distinct from the group-by columns $D_1, \ldots, D_j$ in the GROUP BY clause.

More generally, F is a relational table having a primary key represented by a row identifier (RID), d categorical attributes and a numerical attribute: F(RID, $D_1, \ldots, D_d$, A). A categorical attribute is a column in the table F that has a finite number of values, not represented by a measure. Examples of categorical attributes include city, state, gender, and so forth. A numerical attribute is a column in the table F that is associated with a metric measure, such as height, sales volume, and so forth. In performing horizontal aggregation according to some embodiments on table F, the table F is manipulated as a cube with d dimensions and one measure. Categorical attributes (dimensions) are used to group rows to aggregate numerical attributes (measures). Expressions involving measures are passed as arguments to aggregate functions. F can either be a base table or a temporary table resulting from some SQL query or a view.

The following is a list of rules for use of the HAGG( ) aggregate function:

(1) The GROUP BY clause is optional.
(2) The BY clause, inside the function call, is required. The column list ($D_{j+1}, \ldots, D_k$) in the BY clause must be non-empty and must be disjoint from the column list in the GROUP BY clause ($D_1, \ldots, D_j$). There is no limit number on the columns in the BY column list from table F. If a GROUP BY clause is not present in the query, aggregations are computed with respect to all rows.
(3) Other SELECT aggregate terms may use other aggregate functions (e.g. SUM( ); AVG( ); COUNT( ); MAX( )) based on the same GROUP BY clause based on columns $D_1, \ldots, D_j$.
(4) Grouping columns may be given in any order.
(5) There may be different horizontal aggregations with different base aggregations (SUM, COUNT, MIN, etc.) and different sets of columns for the subgroups. In other words, when HAGG( ) is invoked more than once in a query, in different terms, each HAGG( ) instance can be used with different grouping columns to compute individual aggregations. Columns used in each call must be disjoint from the columns used in the GROUP BY clause.

To produce the horizontal aggregation depicted in Table 1, the following SQL query can be issued to the database system:

SELECT StoreID, SUM(SalesAmt BY DayOfWeek), SUM(SalesAmt)
FROM SALES GROUP BY StoreID;

Note that the query above includes both a horizontal aggregate function and a vertical aggregate function. As shown in Table 1 above, the seven possible values of the DayOfWeek attribute are provided in seven corresponding columns of the output result. The SUM aggregate function is invoked twice—the first time to perform horizontal aggregation by day of the week, and the second time to perform aggregation by the StoreID value (the Total Sales column of the output result depicted in Table 1).

The following is another example query to obtain the percentage of sales in each city contributed to its state, where the output is in horizontal format based on horizontal aggregation:

SELECT State, SUM(SalesAmt BY City)/SUM(SalesAmt)
FROM Sales
GROUP BY State;

The output result from this query is shown below:

TABLE 2

| State | SalesPct Los Angeles | SalesPct San Francisco | SalesPct Dallas | SalesPct Houston |
|---|---|---|---|---|
| CA | 21.7% | 78.3% | | |
| TX | | | 57.1% | 42.9% |

In the output result of Table 2, the plural aggregate values in each row add up to 100%. Thus, in California, 21.7% of the sales (in the SALES table) occurred in Los Angeles, whereas 78.3% of the sales occurred in San Francisco. Similarly, in Texas, 57% of the sales occurred in Dallas, whereas 42.9% of the sales occurred in Houston.

In data mining and OLAP applications, a lot of effort is typically expended in cleaning and organizing output results of queries. By employing the horizontal aggregation according to some embodiments of the invention, the format of the output results can more readily be applied to inputs of a data mining, OLAP, or other statistical or analytical application. Generally, summarized results have to be in horizontal format for efficient use by statistical or analytical applications.

Another example output of a horizontal aggregation is provided below. The query below provides the sales and number of transactions by store for each day of the week and total sales for each department of the store:

SELECT StoreID, SUM(SalesAmt BY DayOfWeek),
Count(DISTINCT TransactionID BY DayOfWeek),
SUM(SalesAmt BY Department),
FROM SALES GROUP BY StoreID;

This query produces a result table that is depicted in Table 3, below.

SELECT EmployeeID, SUM(1 BY Gender DEFAULT 0),
SUM(1 BY MaritalStatus DEFAULT 0),
SUM(Salary)
FROM Employee GROUP BY EmployeeID;

The output of the query above is depicted in Table 4:

TABLE 4

| | Gender | | MaritalStatus | | |
|---|---|---|---|---|---|
| EmployeeID | M | F | Single | Married | Salary |
| 1 | 1 | 0 | 1 | 0 | 30k |
| 2 | 0 | 1 | 1 | 0 | 50k |
| 3 | 0 | 1 | 0 | 1 | 40k |
| 4 | 1 | 0 | 1 | 0 | 45k |

When computing vertical aggregation in SQL, there may be missing groups if there are no qualifying rows. For instance, there may not be any sales in a particular day of the week. This is usually solved by inserting missing rows with zeroes or doing outer joins. With horizontal aggregations, the issue of missing rows disappears, because the output is created column-wise instead of row-wise. This feature may provide another reason to prefer horizontal aggregations over vertical aggregations when uniform output is desired.

One potential issue with horizontal aggregations that would not occur with vertical aggregations is reaching the maximum number of columns in the database system. This may become an issue when the columns $D_{j+1}, \ldots, D_k$ have a high number of distinct values or when there are several horizontal aggregations in the same query. One way to solve this limitation is vertically partitioning the columns so that the maximum number of columns is not exceeded. Each partition table has $D_1, \ldots, D_j$ as its primary key.

FIG. 1 illustrates an example arrangement of a database system 10 that is capable of performing horizontal aggregations in response to horizontal aggregate functions specified in database queries, such as SQL SELECT statements. In other embodiments, the horizontal aggregate function can be specified in other database queries.

The database system 10 includes a horizontal aggregation routine 100 that is invoked in response to the processing of a

TABLE 3

| | SalesAmt | | | | | | | TransactionCount | | | | | | | SalesAmt | | |
|---|---|---|---|---|---|---|---|---|---|---|---|---|---|---|---|---|---|
| StoreID | Mon | Tue | Wed | Thu | Fri | Sat | Sun | Mon | Tue | Wed | Thu | Fri | Sat | Sun | Dairy | Meat | Drinks |
| 1 | 500 | 200 | 120 | 140 | 90 | 230 | 160 | 20 | 2 | 15 | 50 | 50 | 60 | 30 | 400 | 200 | 840 |
| 2 | 200 | 100 | 400 | 100 | 900 | 100 | 200 | 8 | 9 | 5 | 10 | 40 | 20 | 40 | 300 | 300 | 1400 |

The horizontal output of the result table in Table 3 provides sales amounts by each day of the week grouped by stores 1 and 2, the number of transactions by each day of the week grouped by stores 1 and 2, and the number of items in each of the dairy, meat, and drinks departments grouped by stores 1 and 2. Note that the query for producing Table 3 has three horizontal aggregate functions.

Another common task performed in data mining applications is coding categorical attributes as binary attributes. The idea here is to create a binary dimension for each distinct value of the categorical attribute. This is straightforward to do by calling SUM(A BY . . . ) grouping by the primary key of the data set and assigning a default value of zero. Consider the following query that codes the gender and marital status (MaritalStatus) of all employees to try to analyze potential relationships with their salaries.

query containing a horizontal aggregate function. The horizontal aggregation routine 100, in the illustrated embodiment, is part of database software 102 that is executable on one or more central processing units (CPUs) 104 in the database system. The one or more CPUs 104 are connected to system memory 106.

The database software 102 also includes a parsing engine 108 and access modules 110. The database system 10 in accordance with one embodiment of the invention is a parallel database system that includes multiple access modules 110 that are able to concurrent access data stored in a storage subsystem 112.

The storage subsystem 112 includes plural storage modules 114 that are accessible by respective access modules 110. Each access module 110 is capable of performing the following tasks: insert, delete, or modify contents of tables; create, modify or delete the definitions of tables; retrieve information from definitions and tables; and lock databases and tables. In one example, the access modules 110 are based on access module processors (AMPs) used in some TERADATA® database systems from NCR Corporation.

Tables are stored in the storage modules 114. Each table is distributed across the plural storage modules 114 so that the access modules are able to access, in parallel, different portions of the table.

The parsing engine 108 in the database software 102 includes a parser 116 that receives a query (e.g., an SQL query) from a user interface, such as a user interface in a client station 12 coupled to the database system 10 over a network. The parser 116 parses the query and checks the query for proper syntax. Based on the query, an optimizer 118 in the parser 116 selects a least cost access plan from multiple possible access plans for processing the query. The selected access plan contains steps that are to be performed by the access modules 110. A scheduler 120 in the parsing engine 108 sends the steps to the access modules 110 for execution. In response to these steps, the access modules 110 perform operations on data or data structures (e.g., tables, views, and so forth) stored in the storage modules 114 in the storage subsystem 112. If performance of horizontal aggregation is requested, then the horizontal aggregation routine 100 is called by the access modules 110. Note that multiple instances of the horizontal aggregation routine 100 can be invoked for performing horizontal aggregation in different transactions in the database system.

Figure 2:
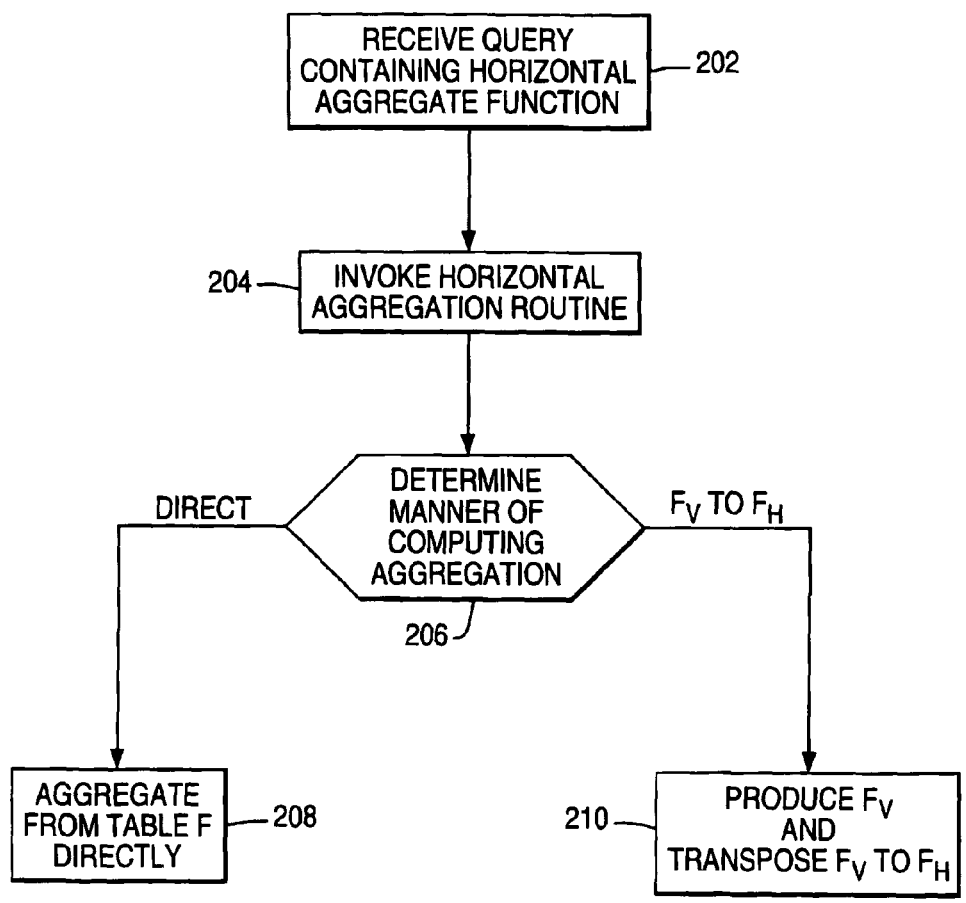
FIG. 2 is a flow diagram of a process of computing horizontal aggregates in the database system of FIG. 1, in accordance with an embodiment.

FIG. 2 illustrates a process of performing horizontal aggregation according to an embodiment. The database system 10 receives (at 202) a query that specifies at least one horizontal aggregate function. As discussed above, the received query can have the following form:

SELECT $D_1, \ldots, D_j$, HAGG(A BY $D_{j+1}, \ldots, D_k$)
FROM F
GROUP BY $D_1, \ldots, D_j$;

The inputs for computing the horizontal aggregation include:
(1) A list of GROUP BY columns, $D_1, \ldots, D_j$. This list may be empty.
(2) Columns to produce individual aggregations in horizontal (transposed) form: $D_{j+1}, \ldots, D_k$. This list must have at least one element. If there are N distinct combinations of values of $D_{j+1}, \ldots, D_k$, then there will be N distinct result columns.
(3) An argument to aggregate given by an arithmetic expression or a column name given by A. In the case of COUNT( ) being the aggregate function, the argument can be * or the DISTINCT keyword followed by an expression.

In response to the received query, the database system 10 invokes (at 204) the horizontal aggregation routine 100. The horizontal aggregation routine 100 determines (at 206) whether the horizontal aggregation is to be computed (at 208) directly from the table F or by producing (at 210) an intermediate table $F_V$ and then transposing (at 210) rows from $F_V$ to produce $F_H$. $F_V$ represents a result table obtained by vertical aggregations, while $F_H$ represents a result table produced by horizontal aggregations.

According to one implementation, the criteria to perform one of the above is as follows: (1) $F_H$ is computed directly from F when there are no more than two columns in the list $D_{j+1}, \ldots, D_k$ and each of them has a very low number of distinct values; (2) $F_H$ is computed from $F_V$ when there are three or more grouping columns or when the grouping columns have a high number of distinct values.

The evaluation of a query containing a horizontal aggregate function involves combining the desired aggregation HAGG( ) with CASE statements for each distinct combination of values of $D_{j+1}, \ldots, D_k$. The MIN( ) and MAX( ) aggregations need to set the result to null when there are no qualifying rows for the specific horizontal group.

As noted above, the result table containing the horizontal aggregations is $F_H$. One of the approaches of computing $F_H$ is to first compute $F_V$, followed by transposing $F_V$ to obtain all aggregations of one group on the same row to produce $F_H$. The content of $F_V$ is populated as follows:

INSERT INTO $F_V$
SELECT $D_1, \ldots, D_j$, Vagg(A)
FROM F GROUP BY $D_1, \ldots, D_j$;

First, the distinct value combinations based on $F_V$ are obtained, and a table having as columns the unique combinations is created, according to the following SQL statement:

SELECT DISTINCT $D_{j+1}, \ldots D_k$ FROM $F_V$;

Assume this statement returns a table with N distinct rows. Then each row is used to define one column to store an aggregation for one specific combination of dimension values.

Next, a table $F_H$ is defined that has the j dimension columns as primary key and N columns that together make up 100% for one group. In the following query, h=j+1:

CREATE TABLE $F_H$ (
$D_1$ int; $\ldots$, $D_j$ int,
$D_h \text{eqv}_{h1} \ldots D_k \text{eqv}_{k1}$ real,
$D_h \text{eqv}_{h2} \ldots D_k \text{eqv}_{k2}$ real,
$\ldots$,
$D_h \text{eqv}_{hN} \ldots D_k \text{eqv}_{kN}$ real)
) PRIMARY KEY($D_1, \ldots, D_j$);

Then, based on those unique combinations, the rows of $F_V$ are transposed and inserted into $F_H$:

INSERT INTO $F_H$
SELECT $D_1, \ldots, D_j$,
sum(CASE WHEN $D_h = V_{h1}$ and $\ldots$ and $D_k = v_{k1}$
THEN A ELSE 0 END)
$\ldots$,
sum(CASE WHEN $D_h = V_{hN}$ and $\ldots$ and $D_k = V_{kN}$
THEN A ELSE 0 END)
FROM $F_V$ GROUP BY $D_1, \ldots, D_j$;

In some cases this approach may be slow because it requires running the entire process for $F_V$, creating $F_H$, and populating $F_H$. This process incurs some overhead with at least five SQL statements. An alternative approach is computing horizontal aggregations directly from F. The table definition above is the same because the distinct values of columns $D_{j+1}, \ldots, D_k$ from $F_V$ are the same as the values of $D_{j+1}, \ldots, D_k$ from F.

The SQL code to compute horizontal aggregations directly from F, calling standard vertical aggregations in each term, is as follows:

SELECT $D_1, \ldots, D_j$,
VAGG(CASE WHEN $D_h = v_{h1}$ and $\ldots$ and $D_k = V_{k1}$
THEN A ELSE 0 END)
$\ldots$,
VAGG(CASE WHEN $D_h = v_{hN}$ and $\ldots$ and $D_k = V_{kN}$
THEN A ELSE 0 END)
FROM F GROUP BY $D_1, \ldots, D_j$;

As can be seen the code is similar to the code presented before, with the main difference being that that the latter approach calls VAGG( ) in each term and in the GROUP BY clause. This same statement can also work by substituting F for $F_V$, but for the sake of clarity the simpler SQL code is presented above. This statement computes aggregations in one scan. It also has the advantage of only using one table to compute sums instead of two tables that are employed in the case where $F_V$ is transposed to $F_H$. The main drawback is that there must be a feedback process to produce the table definition. To make this statement dynamic, the SQL language would have to provide a primitive to transpose (denormalize) and aggregate at the same time.

Instructions of the various software routines or modules discussed herein (such as the database software 102, which includes the horizontal aggregation routine 100, access modules 110, and parsing engine 108, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. A method of computing aggregates in a database system, comprising:
   receiving a query that specifies a grouping operation and an aggregate operation; and
   producing, by one or more processors, plural aggregate values in an output row in response to the query, wherein receiving the query comprises receiving a query containing a horizontal aggregate function and a GROUP BY clause specifying grouping columns $D_1, \ldots, D_j$, the horizontal aggregate function including an argument list that specifies an aggregate column A and sub-grouping columns $D_{j+1}, \ldots, D_k$ that specify groups in the output row.

2. The method of claim 1, wherein the output row has plural columns, and wherein producing the plural aggregate values comprises providing the aggregate values in corresponding columns of the output row.

3. The method of claim 1, further comprising producing plural output rows based on the grouping columns $D_1, \ldots, D_j$, wherein producing the aggregate values comprises producing aggregate values in plural columns of each output row, the plural columns defined by the sub-grouping columns $D_{j+1}, \ldots, D_k$.

4. The method of claim 1, wherein receiving the query comprises receiving the query that contains another horizontal aggregate function.

5. The method of claim 1, wherein receiving the query comprises receiving the query that contains a vertical aggregate function in addition to the horizontal aggregate function.

6. An article comprising at least one non-transitory machine-readable storage medium storing instructions that when executed cause a database system to:
   receive a query containing a GROUP BY clause specifying grouping columns $D_1, \ldots, D_j$, and a horizontal aggregate function having an argument list specifying aggregate attribute A and sub-grouping columns $D_{j+1}, \ldots, D_k$; and
   in response to the query containing the GROUP BY clause and the horizontal aggregate function, produce aggregate values in a horizontal format according to the argument list of the horizontal aggregate function, wherein the aggregate values are produced by applying the horizontal aggregate function on the aggregate attribute A.

7. The article of claim 6, wherein producing the aggregate values in the horizontal format comprises providing plural aggregate values in each of one or more output rows generated as a result of processing the query.

8. The article of claim 7, wherein the instructions when executed cause the database system to further:
   output plural rows for plural groups defined by the grouping columns of the GROUP BY clause, wherein each of the plural rows contains plural aggregate values.

9. The article of claim 8, wherein each of the output rows contains plural columns in the horizontal format, the plural columns containing respective aggregate values, wherein the sub-grouping columns of the horizontal aggregate function define the plural columns of each output row.

10. The article of claim 6, wherein the received query specifies a table on which horizontal aggregation is to be performed, the instructions when executed causing the database system to perform horizontal aggregation directly from the table.

11. The article of claim 6, wherein the received query specifies a table on which horizontal aggregation is to be performed, the instructions when executed causing the database system to:
   perform vertical aggregation based on the table and inserting results of the vertical aggregation into a first table;
   transpose content of the first table and inserting results of the transposing into a second table.

12. The article of claim 6, wherein the instructions when executed cause the database system to further produce plural output rows based on the grouping columns $D_1, \ldots, D_j$,
   wherein producing the aggregate values comprises producing aggregate values in plural columns of each output row, the plural columns defined by the sub-grouping columns $D_{j+1}, \ldots, D_k$.

13. A database system comprising:
   a storage to store a table; and
   a controller comprising at least one processor to:
      receive a query containing a GROUP BY clause specifying grouping columns $D_1, \ldots, D_j$, and a horizontal aggregate function specifying an aggregate attribute A and sub-grouping columns $D_{j+1}, \ldots, D_k$;
      in response to the horizontal aggregate function, calculate an aggregation to produce aggregate values; and
      produce one or plural output rows, each of the one or plural output rows containing plural aggregate values corresponding to groups specified by the sub-grouping columns of the horizontal aggregate function.

14. The database system of claim 13, wherein the controller comprises plural access modules, and the storage comprises plural storage modules, the plural access modules to concurrently access respective plural storage modules, and
   wherein the table is distributed across the plural storage modules.

* * * * *